W. Selpho,
Artificial Leg,
Nº 14,836. Patented May 6, 1856.
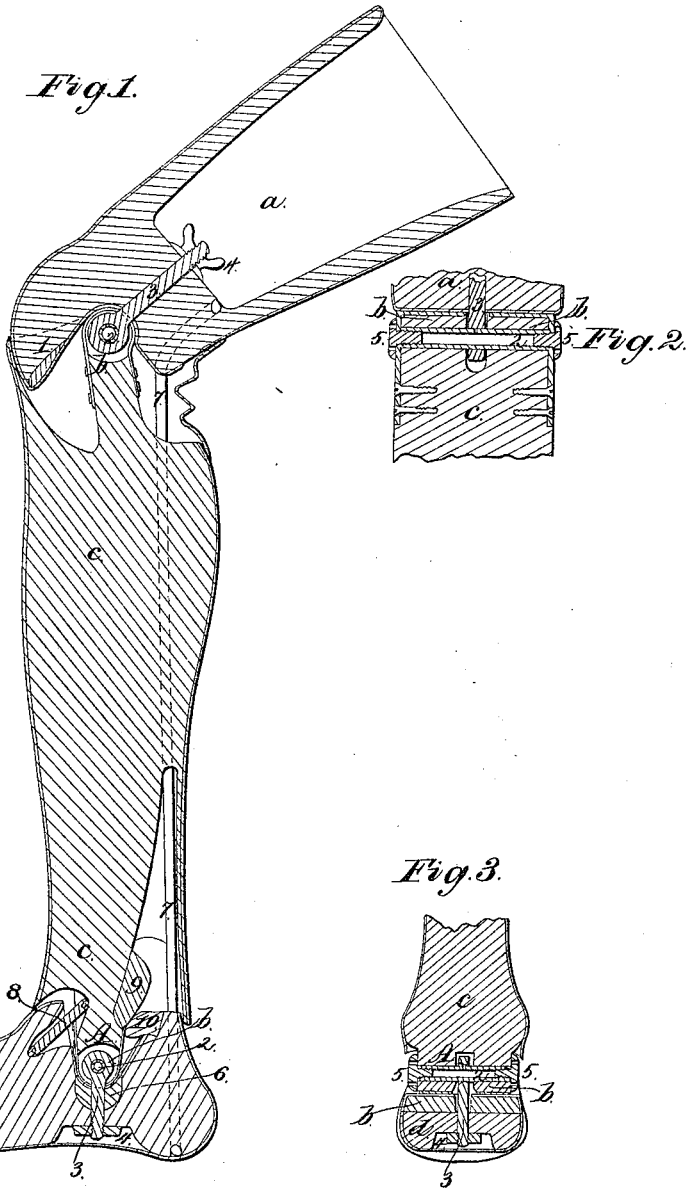
Witnesses.
Lemuel W. Serrell
Thomas G. Harold
Inventor.
William Selpho

UNITED STATES PATENT OFFICE.

WILLIAM SELPHO, OF NEW YORK, N. Y.

CONSTRUCTION OF ARTIFICIAL LEGS.

Specification of Letters Patent No. 14,836, dated May 6, 1856.

*To all whom it may concern:*

Be it known that I, WILLIAM SELPHO, of the city, county, and State of New York, have invented, made, and applied to use certain new and useful Improvements in Artificial Legs; and I do hereby declare that the following is a full, clear, and exact description of the construction and operation of the same, reference being had to the annexed drawing, making part of this specification, wherein—

Figure 1, is a vertical section of the leg complete. Fig. 2, is a vertical section crosswise of the knee joint and Fig. 3, is a similar section at the ankle joint.

Similar marks of reference indicate the same parts.

The nature of my said invention consists in so forming the joint at the knee that there is not the least liability to move sidewise but at the same time the limb is free to move in the natural manner. I also make use of a similar joint for the ankle, but apply in connection with the same an india rubber cushion which allows the foot to accommodate itself to any inequalities of the surface on which it rests.

In the drawing $a$, is the socket receiving the stump of the leg, of any desired size, form or character; and on the lower end of said socket a semi circular recess is formed running crosswise of said socket, and the forward part 1 of the lower end of the socket is formed in a hemispherical shape similar to the natural knee cap. The socket and also the other parts of the limb are to be covered with leather or any suitable material in the ordinary manner, and the semi circular recess before mentioned is to be lined with leather and sets over a semicylindrical joint $b$, formed on the upper end of the lower part $c$, of the limb. The parts are to be formed as shown so that the socket and lower limb can have the requisite motion, and the projection 1, which is faced with elastic material determines the extent of motion when the limb is straightened out.

The joint $b$, is to be capped with sheet brass or similar material, and provided with straps running down the sides of the limb for the purpose of strengthening the same, and in the center thereof, a pipe 2, is inserted passing through the eye of the pin 3, that is retained within the socket $a$, by means of a screw nut 4. Into each end of the pipe 2, screws 5, 5, are inserted, and in the top side of the pipe within the eye of the pin 3, a small hole is bored. It will now be apparent that while the semicylindrical joint $b$, receives all the weight of the wearer, and only has a motion in the forward and backward direction, that the pipe 2, and pin 3, connect said parts together and that the pipe also forms a receptacle for oil or grease to lubricate the parts of the joint, the same being filled by removing one of the screws, 5, and working out of the small hole in the upper side of the pipe.

$d$, is the foot attached to the lower limb by the ankle joint at A, and this ankle joint is formed substantially the same as the knee joint and has similar marks of reference, with the exception that the foot is hollowed down below the joint and fitted with an india rubber or similar elastic cushion, 6, onto which the semicylindrical joint rests, and the eye of the pin 3, is made to fit loosely onto the pipe 2, so that a slight yielding motion is allowed in order that the foot may rest flat onto the surface on which it sets, even if that surface be not level. The joint in the foot should be covered with leather over the india rubber to prevent friction.

The usual cord 7, is provided, connecting the stump and foot, and a spring $s$, from the forward part of the foot to the lower limb $c$, is also made use of, as now practiced. On the back part of the ankle joint A, an india rubber cushion 9 is provided, and on the heel part of the foot $d$, a similar elastic cushion 10, is fitted, so that when the ankle joint is put together these two cushions come in contact and tend to throw down the heel and elevate the toe, greatly facilitating the use of this limb.

The wooden foot is cut off a little short of the toes and made as a lap joint with a piece of india rubber formed into the shape of the toes as seen at $e$. This greatly facilitates walking and gives the foot a natural appearance, at the same time it is very cheap and easily attached.

I do not claim a ball and socket joint as these have been used, but the same are liable to motion and wear sidewise; neither do I claim two knuckle or strap joints as these have been used, one on each side of the knee or ankle joints but these are objectionable on account of the small bearing surface; neither do I claim springs for throwing the toes of the foot up; neither do I claim spring toes in themselves, as they have heretofore been jointed onto the foot and kept in place by metallic springs, but

What I claim and desire to secure by Letters Patent is—

1. The semicylindrical joint (b,) fitted with the pipe 2, and pin 3, to connect said joint together and give facility for lubricating the same in the manner and as specified.

2. I also claim in combination with said semicylindrical joint, the elastic cushion 6, at the ankle joint for the purposes specified.

3. I also claim the elastic cushions 9 and 10, on the upper part of the heel and lower part of the limb c, to act in the manner and for the purposes specified.

4. I also claim attaching artificial toes of india rubber to the wooden part of the foot to act in the manner and for the purposes specified.

In witness whereof I have hereunto set my signature this ninth day of April 1856.

WILLIAM SELPHO.

Witnesses:
LEMUEL W. SERRELL,
THOMAS G. HARELD.